US012725803B2

(12) United States Patent
Ryu et al.

(10) Patent No.: US 12,725,803 B2
(45) Date of Patent: Sep. 1, 2026

(54) LITHIUM SECONDARY BATTERY AND MANUFACTURING METHOD OF THE SAME

(71) Applicant: LG Energy Solution, Ltd., Seoul (KR)

(72) Inventors: Ji Hoon Ryu, Daejeon (KR); Bum Young Jung, Daejeon (KR); Jung Hoon Lee, Daejeon (KR); Yeo Min Yoon, Daejeon (KR); Jae Won Lee, Daejeon (KR); Yong Hee Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 751 days.

(21) Appl. No.: 18/024,437

(22) PCT Filed: Sep. 16, 2021

(86) PCT No.: PCT/KR2021/012734

§ 371 (c)(1),
(2) Date: Jun. 9, 2023

(87) PCT Pub. No.: WO2022/060140

PCT Pub. Date: Mar. 24, 2022

(65) Prior Publication Data

US 2024/0030441 A1 Jan. 25, 2024

(30) Foreign Application Priority Data

Sep. 21, 2020 (KR) ........................ 10-2020-0121824

(51) Int. Cl.

| | |
|---|---|
| ***H01M 4/62*** | (2006.01) |
| ***H01M 4/04*** | (2006.01) |
| ***H01M 4/131*** | (2010.01) |
| ***H01M 4/1391*** | (2010.01) |
| ***H01M 4/505*** | (2010.01) |
| ***H01M 4/525*** | (2010.01) |
| ***H01M 10/0525*** | (2010.01) |
| ***H01M 10/0565*** | (2010.01) |
| ***H01M 10/058*** | (2010.01) |
| *H01M 4/02* | (2006.01) |

(52) U.S. Cl.

CPC ........... *H01M 4/62* (2013.01); *H01M 4/0404* (2013.01); *H01M 4/131* (2013.01); *H01M 4/1391* (2013.01); *H01M 4/505* (2013.01); *H01M 4/525* (2013.01); *H01M 10/0525* (2013.01); *H01M 10/0565* (2013.01); *H01M 10/058* (2013.01); *H01M 2004/028* (2013.01); *H01M 2300/0025* (2013.01); *H01M 2300/0085* (2013.01)

(58) Field of Classification Search

None

See application file for complete search history.

(56) References Cited

U.S. PATENT DOCUMENTS

| | | | | |
|---|---|---|---|---|
| 2005/0238957 | A1* | 10/2005 | Kim | H01M 4/0404 252/182.1 |
| 2013/0280608 | A1 | 10/2013 | Kim et al. | |
| 2013/0288119 | A1 | 10/2013 | Kim et al. | |
| 2016/0028110 | A1 | 1/2016 | Yu et al. | |
| 2016/0254572 | A1 | 9/2016 | Yu et al. | |
| 2018/0123169 | A1* | 5/2018 | Solan | H01M 10/0585 |
| 2018/0294483 | A1* | 10/2018 | Zhang | H01M 10/052 |
| 2019/0198838 | A1 | 6/2019 | Roberts et al. | |
| 2019/0267660 | A1 | 8/2019 | Lee et al. | |
| 2020/0251714 | A1* | 8/2020 | Ryu | H01M 4/13 |
| 2020/0373614 | A1 | 11/2020 | Oh et al. | |
| 2022/0328933 | A1 | 10/2022 | Roberts et al. | |

FOREIGN PATENT DOCUMENTS

| | | | |
|---|---|---|---|
| CN | 105006592 | A | 10/2015 |
| CN | 108695487 | A | 10/2018 |
| CN | 108987752 | A | 12/2018 |
| CN | 110518250 | A | 11/2019 |
| CN | 110603681 | A | 12/2019 |
| CN | 111108633 | A | 5/2020 |
| CN | 111244537 | A | 6/2020 |
| EP | 3605706 | A1 | 2/2020 |
| JP | 2015062158 | A | 4/2015 |
| JP | 2015537352 | A | 12/2015 |
| JP | 2018081788 | A | 5/2018 |
| JP | 2019530958 | A | 10/2019 |
| KR | 20060045320 | A | 5/2006 |
| KR | 20160038735 | A | 4/2016 |
| KR | 20190060522 | A | 6/2019 |
| KR | 20190088331 | A | 7/2019 |
| KR | 20190124518 | A | 11/2019 |

(Continued)

OTHER PUBLICATIONS

International Search Report for PCT/KR2021/012734 mailed Dec. 24, 2021. 3 pages.

(Continued)

*Primary Examiner* — Wyatt P Mcconnell
(74) *Attorney, Agent, or Firm* — Lerner David LLP

(57) ABSTRACT

Provided are a lithium secondary battery and a manufacturing method thereof capable of improving the lifespan properties and high-temperature storage properties of the lithium secondary battery, wherein the lithium secondary battery includes a positive electrode including a positive electrode active material layer containing a positive electrode active material and one or more additives selected from succinonitrile (SN), propane sultone (PS), and propene sultone (PRS). The lithium secondary battery further includes a negative electrode, a separator interposed between the positive electrode and the negative electrode, and a gel polymer electrolyte, wherein the additive is included in an amount of 0.2 parts by weight to 5.0 parts by weight based on 100 parts by weight of the positive electrode active material layer.

11 Claims, No Drawings

(56) References Cited

FOREIGN PATENT DOCUMENTS

| | | | |
|---|---|---|---|
| WO | 2018044952 | A1 | 3/2018 |
| WO | 2019208958 | A1 | 10/2019 |

OTHER PUBLICATIONS

Extended European Search Report including Written Opinion for Application No. 21869762.1 dated Sep. 27, 2024, pp. 1-10.

* cited by examiner

LITHIUM SECONDARY BATTERY AND MANUFACTURING METHOD OF THE SAME

CROSS-REFERENCE TO RELATED APPLICATIONS

This application is a national phase entry under 35 U.S.C. § 371 of International Appl. No. PCT/KR2021/012734, filed on Sep. 16, 2021, which claims priority from Korean Patent Application No. 10-2020-0121824, filed on Sep. 21, 2020, the disclosures of which are incorporated by reference herein.

TECHNICAL FIELD

The present invention relates to a lithium secondary battery and a manufacturing method of the same.

BACKGROUND ART

Recently, the demand for a small and lightweight secondary battery having a relatively high capacity has rapidly increased due to the rapid spread of electronic devices using batteries, such as cell phones, notebook computers, electric vehicles, and the like. Particularly, a lithium secondary battery is lightweight and has a high energy density, and thus is attracting attention as a driving power source for portable devices. Therefore, research and development efforts for improving the performance of a lithium secondary battery have been actively conducted.

A lithium secondary battery generates electric energy by an oxidation and reduction reaction when lithium ions are intercalated/de-intercalated between a positive electrode and a negative electrode including active materials capable of intercalation and de-intercalation of lithium ions. As a positive electrode active material of a lithium secondary battery, a lithium transition metal oxide can be used, and as a negative electrode active material thereof, a lithium metal, a lithium alloy, crystalline carbon, amorphous carbon, a carbon composite, or the like can be used.

In general, a lithium secondary battery is manufactured by injecting an electrolyte solution in a liquid state into a battery case including an electrode assembly having a positive electrode, a negative electrode, and a separator wound or stacked therein. Typically, a lithium secondary battery uses an electrolyte solution in a liquid state so that the composition in the electrolyte solution is uniformly maintained.

Meanwhile, despite the differences in electrolyte solution components (e.g. additives, solvents, etc.) required according to the type of electrode (positive electrode or negative electrode), there has been a limitation in that many additives, solvents, etc. are to be used unnecessarily to satisfy desired battery performance because the composition in the electrolyte solution is uniform. In addition, in this case, side reactions may increase due to unnecessarily excessive additives, solvents, etc., and there has been also a limitation in that material costs may increase due to such additions.

Also, when electrolyte solution components are adjusted to be different according to the type of an electrode to satisfy desired battery performance, solvents, additives, etc. are moved until the composition in the electrolyte solution becomes uniform due to the differences in concentrations of the electrolyte components, that is, until the concentration equilibrium is achieved, so that there has been a limitation in that battery performance is rather degraded over time.

Accordingly, there is a need for a lithium secondary battery which has improved lifespan properties and high-temperature storage properties, that is, which is capable of maintaining initial performance for a long time, without including unnecessarily many additives.

Technical Problem

An aspect of the present invention provides a lithium secondary battery, and a manufacturing method thereof, in which the lifespan properties and high-temperature storage properties of the lithium secondary battery may be improved.

Technical Solution

According to an aspect of the present invention, there is provided a lithium secondary battery including a positive electrode including a positive electrode active material layer containing a positive electrode active material and one or more additives selected from succinonitrile (SN), propane sultone (PS), and propene sultone (PRS); a negative electrode; a separator interposed between the positive electrode and the negative electrode; and a gel polymer electrolyte, wherein the additive is included in an amount of 0.2 parts by weight to 5.0 parts by weight based on 100 parts by weight of the positive electrode active material layer.

According to another aspect of the present invention, there is provided a method for manufacturing a lithium secondary battery, the method including steps of: (A) preparing a positive electrode including a positive electrode active material layer containing a positive electrode active material and one or more additives selected from succinonitrile (SN), propane sultone (PS), and propene sultone (PRS), (B) inserting an electrode assembly into a battery case, the electrode assembly being composed of the positive electrode, a negative electrode, and a separator interposed between the positive electrode and the negative electrode, and (C) injecting a composition for forming a gel polymer electrolyte into the battery case into which the electrode assembly is inserted, and then curing the composition for forming a gel polymer electrolyte to prepare a gel polymer electrolyte, wherein the additive is included in an amount of 0.2 parts by weight to parts by weight based on 100 parts by weight of the positive electrode active material layer.

Advantageous Effects

A lithium secondary battery according to the present invention includes a positive electrode including a positive electrode active material layer containing a specific type of an additive in a specific content, and a gel polymer electrolyte, and thus, may prevent the additive from moving in order to preserve the concentration balance while not including unnecessarily many additives, so that the lifespan properties and high-temperature storage properties are excellent.

A method for manufacturing a lithium secondary battery may provide a lithium secondary battery with improved lifespan properties and high-temperature storage properties without the addition or modification of a particular device in a process.

DETAILED DESCRIPTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

Hereinafter, the present invention will be described in more detail.

Lithium Secondary Battery

A lithium secondary battery according to the present invention includes: a positive electrode including a positive electrode active material layer containing a positive electrode active material and one or more additives selected from succinonitrile (SN), propane sultone (PS), and propene sultone (PRS); a negative electrode; a separator interposed between the positive electrode and the negative electrode; and a gel polymer electrolyte, wherein the additive is included in an amount of 0.2 parts by weight to 5.0 parts by weight based on 100 parts by weight of the positive electrode active material layer.

Positive Electrode

The positive electrode includes a positive electrode active material layer containing a positive electrode active material and one or more additives selected from succinonitrile (SN), propane sultone (PS), and propene sultone (PRS). Specifically, the positive electrode includes a positive electrode current collector and a positive electrode active material layer positioned on at least one surface of the positive electrode current collector, the positive electrode active material layer including the additive and the positive electrode active material.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the current collector to improve the adhesion of the positive electrode active material. For example, the positive electrode current collector may be used in various forms such as a film, a sheet, a foil, a net, a porous body, a foam, a non-woven body, and the like.

The positive electrode active material layer may include a conductive material and a binder, in addition to the additive and the positive electrode active material.

According to the present invention, the additive may be one or more selected from succinonitrile (SN), propane sultone (PS), and propene sultone (PRS), preferably may be succinonitrile (SN), propane sultone (PS), and propene sultone (PRS), and more preferably may be succinonitrile (SN). The additive may suppress side reactions which may occur in the gel polymer electrolyte to reduce gas generation. Also, the additive may be uniformly distributed in a thickness direction in the positive electrode active material layer, without affecting the physical properties of the positive electrode. When the additive is not uniformly present in the positive electrode active material layer, but is rich on the surface of the positive electrode active material layer, there may be a problem in that the additive acts as resistance against the movement of lithium ions, thereby degrading lithium mobility.

The additive may be present in a gel state. Since the additive is present only in the positive electrode active material layer and rarely moves to the gel polymer electrolyte, the lithium secondary battery according to the present invention may have excellent lifespan properties. That is, the additive does not penetrate the separator and spread to the negative electrode, but is present only in the positive electrode, and thus, may continuously protect the positive electrode.

According to the present invention, the additive may be included in an amount of 0.2 parts by weight to 5.0 parts by weight based on 100 parts by weight of the positive electrode active material layer, preferably 0.5 parts by weight to 3.0 parts by weight, and more preferably 1.0 part by weight to 3.0 parts by weight. When the additive is included in an amount of less than 0.2 parts by weight based on 100 parts by weight of the positive electrode active material layer, there is a problem in that the performance of the additive is not exhibited. When the additive is included in an amount of greater than 5.0 parts by weight based on 100 parts by weight of the positive electrode active material layer, there is a problem in that the additive interferes with the movement of lithium ions, so that the resistance of the secondary battery increases. When the content of the additive is within the above range, side reactions with the electrolyte solution at a high temperature are suppressed without an increase in the resistance of the secondary battery, so that storage performance is excellent and lifespan performance is also improved.

According to the present invention, the positive electrode active material may be one or more selected from an NCM-based positive electrode active material, an NCA-based positive electrode active material, an NCMA-based positive electrode active material, and $LiFePO_4$.

Specifically, the positive electrode active material may have a composition represented by Formula 1 below.

[Formula 1]

$$Li_x[Ni_aCo_bM^1_cM^2_d]O_2 \quad \text{[Formula 1]}$$

In Formula 1 above, $M^1$ is one or more selected from Mn and Al, $M^2$ is one or more selected from B, Mg, Ca, Ti, V, Cr, Fe, Zn, Ga, Y, Zr, Nb, Mo, Ta, and W, and $0.9 \le x \le 1.2$, $0.5 \le a < 1$, $0 < b < 0.5$, $0 < c < 0.5$, $0 \le d \le 0.1$, and $a+b+c+d=1$.

a represents the atomic fraction of nickel among metal elements excluding lithium in the positive electrode active material, and the a may satisfy $0.5 \le a < 1$, $0.6 \le a \le 0.98$, or b represents the atomic fraction of cobalt among metal elements excluding lithium in the positive electrode active material, and the b may satisfy $0 < b < 0.5$, $0.01 \le b \le 0.4$, or $0.01 \le b \le 0.3$.

c represents the elemental fraction and an M 1 element among metal elements excluding lithium in the positive electrode active material, and the c may satisfy $0 < c < 0.5$, $0.01 \le c \le 0.4$, or $0.01 \le c \le 0.3$.

d represents the elemental fraction and an M 2 element among metal elements excluding lithium in the positive electrode active material, and the d may satisfy $0 \le d \le 10.1$ or $0 \le d \le 0.05$.

The positive electrode active material may be included in an amount of 80 parts by weight to 99 parts by weight based on 100 parts by weight of the positive electrode active material layer, more specifically 85 parts by weight to 98 parts by weight. When included in the above content range, excellent lifespan properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 1 part by weight to 30 parts by weight based on 100 parts by weight of the positive electrode active material layer.

The binder serves to improve the bonding between positive electrode active material particles and the adhesion between the positive electrode active material and the current collector.

Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 part by weight to 30 parts by weight based on 100 parts by weight of the positive electrode active material layer.

Negative Electrode

The negative electrode includes a negative electrode current collector and a negative electrode active material layer positioned on the negative electrode current collector.

According to the present invention, the negative electrode may not include one or more additives selected from succinonitrile (SN), propane sultone (PS), and propene sultone (PRS). This is because the additive does not cause major reactions in the negative electrode, and when the additive is included in the negative electrode, there is a problem in that the resistance of the secondary battery increases. In addition, when the additive is included in the negative electrode, unnecessary side reactions such as the adsorption of the additive on the surface of the negative electrode (ex. Copper foil) may occur, and the initial resistance of the secondary battery may increase due to the reduction of ion conductivity of lithium ions in the negative electrode. Accordingly, there may be a problem in that the lifespan of the secondary battery decreases.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

The negative electrode active material layer may be prepared by applying a negative electrode mixture material, which is prepared by dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material.

Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

The negative electrode active material may be included in an amount of 80 parts by weight to 99 parts by weight based on 100 parts by weight of the negative electrode active material layer.

The binder is a component for assisting in bonding between a conductive material, an active material, and a current collector, and may be added in an amount of 0.1 parts by weight to 10 parts by weight based on 100 parts by weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 parts by weight or less, preferably 5 parts by weight or less, based on 100 parts by weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; fluorocarbon; metal powder such as aluminum powder, and nickel powder; a conductive whisker such as zinc oxide and potassium titanate; a conductive metal oxide such as titanium oxide; or a conductive material such as a polyphenylene derivative, and the like may be used.

Separator

The separator separates the negative electrode and the positive electrode and provides a movement path for lithium ions. Particularly, a separator having excellent moisture-retention of an electrolyte solution as well as low resistance against ion movement in the electrolyte is preferable.

According to the present invention, the separator may be a porous polymer film. For example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structural body of two or more layers thereof may be used.

The separator is not a separator in a gel form, and thus, there is an advantage in that no special devices or changes to a process currently in use is required to manufacture a secondary battery, which incurs no additional costs.

Gel Polymer Electrolyte

The gel polymer electrolyte is an electrolyte containing a polymer whose flowability is suppressed, and may have a phase angle δ value, which is one indicator for measuring viscoelasticity of a material, of greater than or equal to 45°, specifically greater than or equal to 60°. In this case, due to the low flowability of the electrolyte, the movement of the additive is limited, so that the additive may be continuously rich in the positive electrode to continuously protect the positive electrode.

The gel polymer electrolyte may include a polymer and a lithium salt.

The polymer may be a cured product of a curable polymer such as a thermosetting polymer, a photocurable polymer, an electron beam curable polymer, and the like. For example, the polymer may be a cured product of an acrylic polymer having a weight average molecular weight (Mw) of 1,000 to 10,000.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt may be used in a concentration range of 0.1 M to 2.0 M. When the concentration of the lithium salt is in the above range, the electrolyte has suitable conductivity and viscoelasticity, thereby exhibiting excellent performance, and lithium ions may effectively move.

In order to improve the lifespan properties of a battery, suppress the decrease in battery capacity, and improve the discharge capacity of the battery, the gel polymer electrolyte may further include one or more electrolyte additives, for example, a halo-alkylene carbonate-based compound such as difluoroethylene carbonate, pyridine, triethylphosphite, triethanolamine, cyclic ether, ethylenediamine, n-glyme, hexamethyl phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, or the like.

As described above, the lithium secondary battery according to the present invention exhibits excellent lifespan properties and excellent high-temperature storage performance, and thus, are useful for portable devices such as a mobile phone, a laptop, and a digital camera, and in the field of electric vehicles such as a hybrid electric vehicle (HEV).

Accordingly, a battery module including the lithium secondary battery as a unit cell, and a battery pack including the battery module may be provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

Manufacturing Method of Lithium Secondary Battery

A method for manufacturing a lithium secondary battery according to the present invention includes steps of: (A) preparing a positive electrode including a positive electrode active material layer containing a positive electrode active material and one or more additives selected from succinonitrile (SN), propane sultone (PS), and propene sultone (PRS), (B) inserting an electrode assembly into a battery case, the electrode assembly being composed of the positive electrode, a negative electrode, and a separator interposed between the positive electrode and the negative electrode, and (C) injecting a composition for forming a gel polymer electrolyte into the battery case into which the electrode assembly is inserted, and then curing the composition for forming a gel polymer electrolyte to prepare a gel polymer electrolyte. The additive is included in an amount of 0.2 parts by weight to 5.0 parts by weight based on 100 parts by weight of the positive electrode active material layer.

The lithium secondary battery according to the present invention may be manufactured by the method for manufacturing a lithium secondary battery.

Hereinafter, each step of the manufacturing method of a lithium secondary battery will be described in detail.

Step (A)

Step (A) is a step of preparing a positive electrode including a positive electrode active material layer containing a positive electrode active material and one or more additives selected from succinonitrile (SN), propane sultone (PS), and propene sultone (PRS).

According to the present invention, Step (A) above may include i) preparing a composition for forming a positive electrode active material layer, the composition including a positive electrode active material and one or more additives selected from succinonitrile (SN), propane sultone (PS), and propene sultone (PRS), and ii) applying the composition for forming a positive electrode active material layer on a current collector, followed by drying the applied composition to form a positive electrode active material layer.

In the present invention, the additive is input into the composition for forming a positive electrode active material layer during the manufacturing of a positive electrode, so that the additive may be present in a solid state in the manufactured positive electrode.

Specifically, the positive electrode active material layer may be prepared by applying the composition for forming a positive electrode active material layer on a positive electrode current collector, followed by drying and roll-pressing, the composition being prepared by dispersing the additive, the positive electrode active material, and selectively a binder and a conductive material in a solvent.

The positive electrode active material, the binder, and the conductive material have been described above in the description of the lithium secondary battery according to the present invention, and thus, detailed descriptions thereof will be omitted. Hereinafter, only the rest of the components will be described in detail.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve or disperse the positive electrode active material, the binder, and the conductive material in consideration of the applying thickness and preparation yield of a slurry, and thereafter, have a viscosity which may exhibit excellent thickness uniformity during the application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Step (B)

Step (B) is a step of inserting an electrode assembly into a battery case, the electrode assembly being composed of the positive electrode, a negative electrode, and a separator interposed between the positive electrode and the negative electrode.

The negative electrode may be manufactured by the same method as the positive electrode except that a negative electrode active material is used instead of a positive electrode active material.

The separator has been described above in the description of the lithium secondary battery according to the present invention, and thus, a detailed description thereof will be omitted.

Step (C)

Step (C) is a step of injecting a composition for forming a gel polymer electrolyte into the battery case into which the electrode assembly is inserted, and then curing the composition for forming a gel polymer electrolyte to prepare a gel polymer electrolyte.

When a composition for forming a gel polymer electrolyte is injected into the battery case into which the electrode assembly is inserted, an additive included in the positive electrode active material layer may be dissolved and liquefied in a solvent included in the composition for forming a gel polymer electrolyte until the composition for forming a gel polymer electrolyte is cured. In addition, the additive dissolved in the solvent may be present in a gel state after the composition for forming a gel polymer electrolyte is cured. Meanwhile, the present invention uses a gel polymer electrolyte, not a liquid electrolyte, so that the movement of the additive is limited, thereby allowing the additive to be continuously rich in the positive electrode to continuously protect the positive electrode. That is, even when an additive included in a positive electrode active material layer is dissolved in a solvent included in a composition for forming a gel polymer electrolyte, the additive may be present only in a positive electrode without penetrating a separator and spreading to a negative electrode.

The composition for forming a gel polymer electrolyte may include a curable polymer, a non-aqueous organic solvent, and a lithium salt.

The curable polymer may be a thermosetting polymer, a photocurable polymer, an electron beam curable polymer, and the like. For example, the curable polymer may be an acrylic polymer having a weight average molecular weight (Mw) of 1,000 to 10,000.

Any non-aqueous organic solvent may be used as the non-aqueous organic solvent without particular limitation as long as it may serve as a medium through which ions involved in an electrochemical reaction of a battery may move. Specifically, as the non-aqueous organic solvent, an ester-based solvent such as methyl acetate, ethyl acetate, γ-butyrolactone, and s-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond, an aromatic ring or ether bond); amides such as dimethylformamide; dioxolanes such as 1,3-dioxolane; or sulfolanes may be used. Among the above, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt may be used in a concentration range of 0.1 M to 2.0 M. When the concentration of the lithium salt is in the above range, the electrolyte has suitable conductivity and viscoelasticity, thereby exhibiting excellent performance, and lithium ions may effectively move.

Hereinafter, embodiments of the present invention will be described in detail so that those skilled in the art may easily carry out the present invention. However, the present invention may be embodied in many different forms, and is not limited to the embodiments set forth herein.

EXAMPLES AND COMPARATIVE EXAMPLES

Example 1

$LiNi_{0.8}Co_{0.1}Mn_{0.1}O_2$ as a positive electrode active material, a carbon black (Super P, Timcal Co., Ltd) conductive material, a PVdF binder, and succinonitrile (SN) were mixed in an N-methylpyrrolidone solvent at a weight ratio of 93:2:2:3 to prepare a composition for forming a positive electrode active material, and the composition was applied on one surface of an aluminum current collector, dried at 130° C., and then roll-pressed to manufacture a positive electrode. At this time, the succinonitrile included in a positive electrode active material layer was present in a solid state.

Artificial graphite as a negative electrode active material, a carbon black (Super P, Timcal Co., Ltd) conductive material, and a PVdF binder were mixed in an N-methylpyrrolidone solvent at a weight ratio of 96:1:3 to prepare a composition for forming a negative electrode active material, and the composition was applied on one surface of a copper current collector, dried at 120° C., and then roll-pressed to manufacture a negative electrode.

In a solution in which $LiPF_6$ of 1.0 M was included in a non-aqueous organic solvent in which ethylene carbonate (EC) and ethylmethyl carbonate (EMC) were mixed at a weight ratio of 30:70, 5 parts by weight of an acrylic polymer having a weight average molecular weight of 3,000 were mixed based on 100 parts by weight of the non-aqueous organic solvent to prepare a composition for forming a gel polymer electrolyte.

A porous polyethylene separator was interposed between the positive electrode and the negative electrode manufactured as described above to manufacture an electrode assembly, and the electrode assembly was placed inside a battery case. Thereafter, the composition for forming a gel polymer electrolyte was injected into the case, and the composition for forming a gel polymer electrolyte was thermoset at 40° C. to form a gel polymer electrolyte, thereby manufacturing a lithium secondary battery. At this time, the succinonitrile included in a positive electrode active material layer of the lithium secondary battery was present in a of gel state.

Example 2

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and succinonitrile (SN) were mixed in an N-methylpyrrolidone solvent at a weight ratio of 95.5:2:2:0.5 to prepare a composition for forming a positive electrode active material.

Example 3

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and propane sultone (PS) were mixed in an N-methylpyrrolidone solvent at a weight ratio of 93:2:2:3 to prepare a composition for forming a positive electrode active material.

Example 4

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and propene sultone (PRS) were mixed in an N-methylpyrrolidone solvent at a weight ratio of 93:2:2:3 to prepare a composition for forming a positive electrode active material.

Comparative Example 1

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, and a PVdF binder were mixed in an N-methylpyrrolidone solvent at a weight ratio of 96:2:2 to prepare a composition for forming a positive electrode active material.

Comparative Example 2

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and succinonitrile (SN) were mixed in an N-methylpyrrolidone solvent at a weight ratio of 89:2:2:7 to prepare a composition for forming a positive electrode active material.

Comparative Example 3

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and succinonitrile (SN) were mixed in an N-methylpyrrolidone solvent at a weight ratio of 86:2:2:10 to prepare a composition for forming a positive electrode active material.

Comparative Example 4

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and succinonitrile (SN) were mixed in an N-methylpyrrolidone solvent at a weight ratio of 95.9:2:2:0.1 to prepare a composition for forming a positive electrode active material.

Comparative Example 5

$LiNi_{0.8}Co_{0.1}Mn_{0.1}O_2$ as a positive electrode active material, a carbon black (Super P, Timcal Co., Ltd) conductive material, and a PVdF binder were mixed in an N-methylpyrrolidone solvent at a weight ratio of 96:2:2 to prepare a composition for forming a positive electrode active material, and the composition was applied on one surface of an aluminum current collector, dried at 130° C., and then roll-pressed to manufacture a positive electrode.

Artificial graphite as a negative electrode active material, a carbon black (Super P, Timcal Co., Ltd) conductive material, and a PVdF binder were mixed in an N-methylpyrrolidone solvent at a weight ratio of 96:1:3 to prepare a composition for forming a negative electrode active material, and the composition was applied on one surface of a copper current collector, dried at 120° C., and then roll-pressed to manufacture a negative electrode.

In a solution in which $LiPF_6$ of 1.0 M was included in a non-aqueous organic solvent in which ethylene carbonate (EC) and ethylmethyl carbonate (EMC) were mixed at a weight ratio of 30:70, 1 part by weight of succinonitrile was mixed based on 100 parts by weight of the non-aqueous organic solvent to prepare an electrolyte solution.

A porous polyethylene separator was interposed between the positive electrode and the negative electrode manufactured as described above to manufacture an electrode assembly, and the electrode assembly was placed inside a battery case. Thereafter, the electrolyte solution was injected into the case to manufacture a lithium secondary battery.

Comparative Example 6

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and propane sultone (PS) were mixed in an N-methylpyrrolidone solvent at a weight ratio of 89:2:2:7 to prepare a composition for forming a positive electrode active material.

Comparative Example 7

A lithium secondary battery was manufactured in the same manner as in Example 1 except that $LiNi_{0.8}Co_{0.1}Mn_{0.1}O_2$ as a positive electrode active material, a carbon black (Super P, Timcal Co., Ltd) conductive material, a PVdF binder, and propene sultone (PRS) were mixed in an N-methylpyrrolidone solvent at a weight ratio of 89:2:2:7 to prepare a composition for forming a positive electrode active material.

Comparative Example 8

$LiNi_{0.8}Co_{0.1}Mn_{0.1}O_2$ as a positive electrode active material, a carbon black (Super P, Timcal Co., Ltd) conductive material, and a PVdF binder were mixed in an N-methylpyrrolidone solvent at a weight ratio of 96:2:2 to prepare a composition for forming a positive electrode active material, and the composition for forming a positive electrode active material was applied on one surface of an aluminum current collector, dried at 130° C., and then roll-pressed to manufacture a positive electrode.

Thereafter, succinonitrile (SN) was dissolved at 5 wt % in the N-methylpyrrolidone solvent, applied on the surface of the positive electrode, and then dried to form a coating layer.

Artificial graphite as a negative electrode active material, a carbon black (Super P, Timcal Co., Ltd) conductive material, and a PVdF binder were mixed in an N-methylpyrrolidone solvent at a weight ratio of 96:1:3 to prepare a composition for forming a negative electrode active material, and the composition was applied on one surface of a copper current collector, dried at 120° C., and then roll-pressed to manufacture a negative electrode.

In a solution in which $LiPF_6$ of 1.0 M was included in a non-aqueous organic solvent in which ethylene carbonate (EC) and ethylmethyl carbonate (EMC) were mixed at a weight ratio of 30:70, 5 parts by weight of an acrylic polymer having a weight average molecular weight of 3,000 were mixed based on 100 parts by weight of the non-aqueous organic solvent to prepare a composition for forming a gel polymer electrolyte.

A porous polyethylene separator was interposed between the positive electrode and the negative electrode manufactured as described above to manufacture an electrode assembly, and the electrode assembly was placed inside a battery case. Thereafter, the composition for forming a gel polymer electrolyte was injected into the case, and the composition for forming a gel polymer electrolyte was thermoset at 40° C. to form a gel polymer electrolyte, thereby manufacturing a lithium secondary battery.

EXPERIMENTAL EXAMPLES

Experimental Example 1: Evaluation of Gas Generation Increase Rate and Resistance Increase Rate after High-Temperature Storage Each of the secondary batteries of Examples 1 to 4 and Comparative Examples 1 to 8 was charged to 4.2 V and the volume thereof was measured. Each of the secondary batteries was left to stand at 60° C. for 4 weeks, and the volume of each of the secondary batteries was measured. An increase rate of the volume after the leaving at 60° C. relative to the volume before the leaving at 60° C. is shown as an increase rate of gas generation in Table 1 below.

In addition, each of the secondary batteries of Examples 1 to 4 and Comparative Examples 1 to 8 was charged to 4.2 V, discharged to a SOC of 50% at room temperature, and then instantly discharged at 2.5 C for 10 seconds to measure an amount of change in voltage. A charged voltage was divided by a current to confirm the resistance of each of the secondary batteries. Each of the secondary batteries of Examples 1 to 4 and Comparative Examples 1 to 8 was charged to 4.2 V, and then left to stand at 60° C. for 4 weeks. The resistance of each of the secondary batteries was confirmed in the same manner. An increase rate of the resistance after the leaving at 60° C. relative to the resistance before the leaving at 60° C. is shown in Table 1 below.

TABLE 1

| | Gas generation increase rate (%) | Resistance increase rate (%) |
|---|---|---|
| Example 1 | 1.8 | 9.3 |
| Example 2 | 2.5 | 9.8 |
| Example 3 | 2.0 | 9.5 |
| Example 4 | 2.2 | 9.6 |
| Comparative Example 1 | 2.8 | 10.2 |
| Comparative Example 2 | 1.5 | 12.7 |
| Comparative Example 3 | 1.4 | 15.3 |
| Comparative Example 4 | 2.8 | 10.5 |
| Comparative Example 5 | 2.7 | 10.2 |
| Comparative Example 6 | 1.8 | 13.1 |
| Comparative Example 7 | 2.0 | 13.2 |
| Comparative Example 8 | 1.7 | 12.2 |

Referring to Table 1 above, it can be confirmed that the secondary battery of each of Examples 1 to 4 in which succinonitrile, propane sultone, or propene sultone was included in an amount of 3 parts by weight to 0.5 parts by weight based on 100 parts by weight of the positive electrode active material layer had excellent high-temperature storage properties compared to the secondary battery of Comparative Example 1 in which succinonitrile was not included and the secondary battery of Comparative Example 4 in which succinonitrile was included in an amount of 0.1 parts by weight based on 100 parts by weight of the positive electrode active material layer. That is, it can be confirmed that both the gas generation increase rate and the resistance increase rate after the high-temperature storage were low. Particularly, it can be confirmed that the secondary battery of Example 1 was significantly excellent in high-temperature storage properties. On the contrary, the secondary battery of each of Comparative Examples 2, 3, 6, and 7 in which succinonitrile, propane sultone, or propene sultone was included in excess had a significantly high resistance increase rate since additives interfered with the movement of lithium ions. In addition, it can be confirmed that the secondary battery of Comparative Example 5 in which an electrolyte solution including succinonitrile and in a liquid state was used had poor high-temperature storage properties.

In addition, it can be confirmed that the secondary battery of Comparative Example 8 in which succinonitrile was not included in the positive electrode active material layer but applied on the surface of the positive electrode active material layer had poor high-temperature storage properties.

Experimental Example 2: Evaluation of Initial Charge/Discharge Capacity and Capacity Retention Rate For each of the secondary batteries of Examples 1 to 4 and Comparative Examples 1 to 8, the initial charge/discharge capacity and capacity retention rate were evaluated.

Each lithium secondary battery was charged with a constant current of 0.1 C at 25° C. until the voltage reached 4.2 V, and then discharged with a constant current of 0.1 C until the voltage reached 2.5 V. Initial charge/discharge capacity values are shown in Table 2.

In addition, a charge/discharge cycle was repeated for 100 times with a constant current of 0.33 C at 45° C. in the range of 2.5 to 4.2 V to measure the capacity of the lithium secondary battery, and the ratio of the first cycle capacity to the 100-th cycle capacity is shown as a capacity retention rate in Table 2.

TABLE 2

| | Initial charge capacity (Ah) | Initial discharge capacity (Ah) | Capacity retention rate (%) |
|---|---|---|---|
| Example 1 | 2.20 | 2.18 | 99.2 |
| Example 2 | 2.22 | 2.20 | 98.5 |
| Example 3 | 2.21 | 2.19 | 99.0 |
| Example 4 | 2.20 | 2.18 | 98.9 |
| Comparative Example 1 | 2.22 | 2.20 | 97.3 |
| Comparative Example 2 | 2.17 | 2.15 | 96.8 |
| Comparative Example 3 | 2.11 | 2.09 | 96.5 |
| Comparative Example 4 | 2.22 | 2.20 | 97.5 |
| Comparative Example 5 | 2.22 | 2.20 | 97.8 |
| Comparative Example 6 | 2.17 | 2.15 | 96.2 |
| Comparative Example 7 | 2.17 | 2.14 | 96.0 |
| Comparative Example 8 | 2.15 | 2.13 | 96.5 |

Referring to Table 2, it can be confirmed that the secondary battery of each of Examples 1 to 4 had a significantly excellent capacity retention rate compared to the secondary battery of each of Comparative Examples 1 to 8. This is because, in the case of the secondary battery of each of Examples 1 to 4, gas generated as a result of a side reaction was reduced, so that resistance caused by the gas was reduced.

Accordingly, it can be seen that the lithium secondary battery according to the present invention includes a gel polymer electrolyte and a positive electrode in which a specific type of an additive is included in an amount of 0.2 parts by weight to 5.0 parts by weight based on 100 parts by weight of a positive electrode active material layer, and thus, may prevent the additive from moving in order to preserve the concentration balance while not including unnecessarily many additives, so that the lifespan properties and high-temperature storage properties of the battery are excellent.

In addition, it can be seen that the method for manufacturing a lithium secondary battery according to the present invention may provide a lithium secondary battery with improved lifespan properties and high-temperature storage properties without the addition or modification of a particular device in a process.

The invention claimed is:

1. A lithium secondary battery comprising:
   a positive electrode comprising:
   a positive electrode active material layer comprising a positive electrode active material and one or more additives selected from succinonitrile (SN), propane sultone (PS), and propene sultone (PRS);
   a negative electrode;
   a separator interposed between the positive electrode and the negative electrode; and
   a gel polymer electrolyte,
   wherein the additive is comprised in an amount of 0.2 parts by weight to 5.0 parts by weight based on 100 parts by weight of the positive electrode active material layer, and
   wherein the gel polymer electrolyte has a phase angle δ of greater than or equal to 45°.

2. The lithium secondary battery of claim 1, wherein the additive is uniformly distributed in a thickness direction in the positive electrode active material layer.

3. The lithium secondary battery of claim 1, wherein the additive is comprised in an amount of 0.5 parts by weight to 3.0 parts by weight based on 100 parts by weight of the positive electrode active material layer.

4. The lithium secondary battery of claim 1, wherein the positive electrode active material has a composition represented by Formula 1 below:

$$Li_x[Ni_aCo_bM^1_cM^2_d]O_2 \quad \text{[Formula 1]}$$

wherein, in Formula 1 above,
   $M^1$ is one or more elements selected from Mn and Al,
   $M^2$ is one or more elements selected from B, Mg, Ca, Ti, V, Cr, Fe, Zn, Ga, Y, Zr, Nb, Mo, Ta, and W, and
   $0.9 \le x \le 1.2$, $0.5 \le a < 1$, $0 < b < 0.5$, $0 < c < 0.5$, $0 \le d \le 0.1$, and $a+b+c+d=1$.

5. The lithium secondary battery of claim 1, wherein the negative electrode does not comprise the additive.

6. The lithium secondary battery of claim 1, wherein the separator is a porous polymer film.

7. A method for manufacturing a lithium secondary battery, the method comprising:
   (A) preparing a positive electrode comprising a positive electrode active material layer comprising a positive electrode active material and one or more additives selected from succinonitrile (SN), propane sultone (PS), and propene sultone (PRS);
   (B) inserting an electrode assembly into a battery case, the electrode assembly comprising the positive electrode, a negative electrode, and a separator interposed between the positive electrode and the negative electrode; and
   (C) injecting a composition for forming a gel polymer electrolyte into the battery case into which the electrode assembly is inserted, and then curing the composition for forming a gel polymer electrolyte to prepare a gel polymer electrolyte, wherein the additive is comprised in an amount of 0.2 parts by weight to 5.0 parts by weight based on 100 parts by weight of the positive electrode active material layer.

8. The method of claim 7, wherein the additive is comprised in an amount of 0.5 parts by weight to 3.0 parts by weight based on 100 parts by weight of the positive electrode active material layer.

9. The method of claim 7, wherein:

Step (A) above comprises: i) preparing a composition for forming a positive electrode active material layer, the composition comprising a positive electrode active material and one or more additives selected from succinonitrile (SN), propane sultone (PS), and propene sultone (PRS); and ii) applying the composition for forming a positive electrode active material layer on a current collector, followed by drying the applied composition to form a positive electrode active material layer.

10. The method of claim 7, wherein the negative electrode does not comprise the additive.

11. The method of claim 7, wherein the separator is a porous polymer film.

* * * * *